United States Patent [19]

Gordon et al.

[11] Patent Number: 4,645,931
[45] Date of Patent: Feb. 24, 1987

[54] DETECTOR DEWAR ASSEMBLY

[75] Inventors: William R. Gordon, Burlington; Peter N. Nicholson, Dracut, both of Mass.; John E. Six, Nashua, N.H.

[73] Assignee: Honeywell Inc., Minneapolis, Minn.

[21] Appl. No.: 711,944

[22] Filed: Mar. 15, 1985

[51] Int. Cl.$^4$ ............................................. G01J 1/00
[52] U.S. Cl. .................................. 250/352; 250/349
[58] Field of Search ...................... 250/352, 338, 349; 374/80; 62/514 R

[56] References Cited

U.S. PATENT DOCUMENTS

| | | | |
|---|---|---|---|
| 4,206,354 | 6/1980 | Small, Jr. | 250/352 |
| 4,451,735 | 5/1984 | Diedrich et al. | 250/352 |
| 4,487,037 | 12/1984 | Meignin et al. | 250/352 |
| 4,491,729 | 1/1985 | Stahl et al. | 250/352 |
| 4,546,614 | 10/1985 | Kline et al. | 250/352 |
| 4,565,925 | 1/1986 | Anderson et al. | 250/352 |

*Primary Examiner*—Janice A. Howell
*Attorney, Agent, or Firm*—John S. Solakian; Albin Medved

[57] ABSTRACT

An improved detector dewar assembly in which the flange supporting the upper cap of the dewar assembly comprises a disc ceramic matrix, including buried electrical leads. This disc serves several purposes. First, it provides a vacuum tight electric feedthrough which connects a tape cable from the detector assembly to a pin assembly imbedded in the exterior portion of the disc feedthrough. Second, it includes metalizations on its top and lower surface in order to provide a surface for connecting (by brazing or soldering) the upper cap assembly and the major vessel wall. A tape cable comprising wires embedded in a flexible nonconductive matrix connects the detector element leadout wires with the electrical connectors of the feedthrough disc. The cable forms a collar which substantially surrounds the coldwell and has tabs at its basal portion which fold up to attach to pin or pad connectors on the lower surface of the disc. The use of Manganin, Constantan, or Balco wires produces a tape cable which significantly reduces the heat load on the dewar refrigerator system. Solder/bond rings and pads positioned both on the endwell and disc assembly mate to solder bond/rings and pads/dots positioned on the tape cable thereby providing stress relief.

25 Claims, 5 Drawing Figures

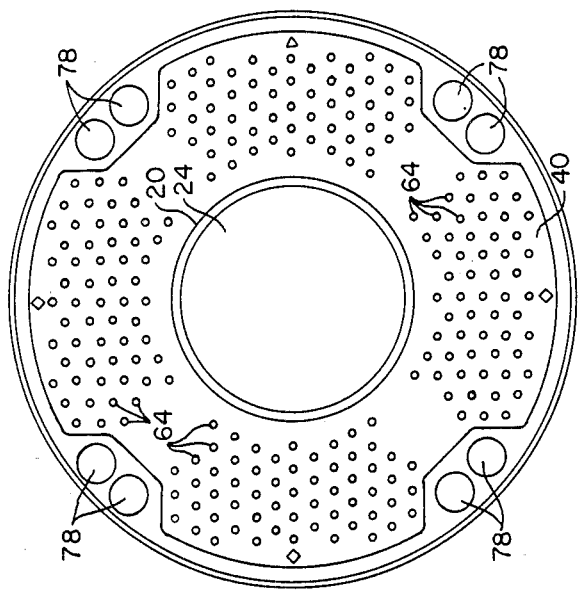
FIG. IA
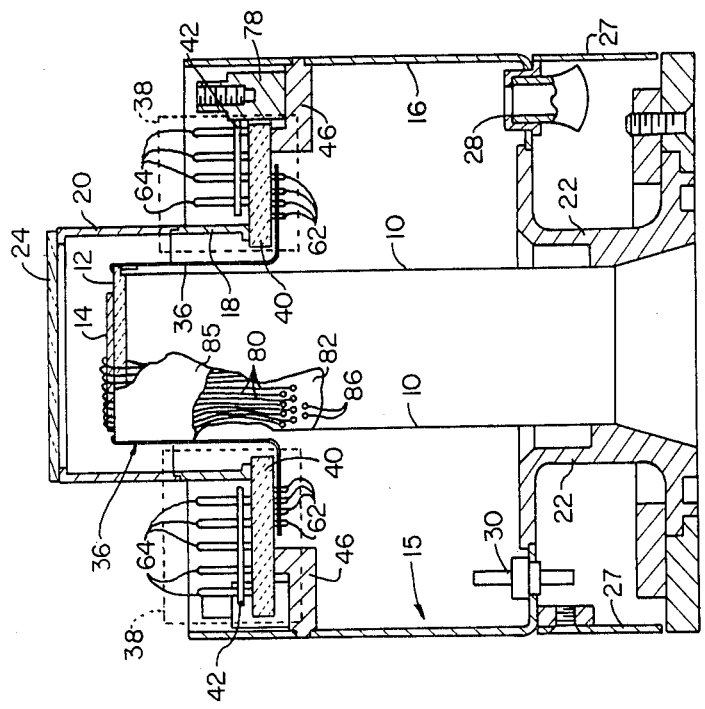
FIG. IB

DETECTOR DEWAR ASSEMBLY

BACKGROUND OF THE INVENTION

The device of the present invention relates to detector dewar assemblies used in thermal imaging systems.

In most thermal imaging systems using semiconductor detection devices which must be cryogenically cooled, it is necessary to provide a housing (or "dewar") for the detector device. The dewar must thermally isolate yet provide electrical connections between the detector array and the housing exterior so that the array may be electrically interfaced to other signal processing subassemblies.

Typically, these dewars include several concentric cylindrical tubes or housings. The inner tube is generally comprised of a long cylindrical glass bore which opens to the base of the dewar. This bore, often referred to as the "coldwell", is multifunctional. First, the detector device or array is mounted at the top of the coldwell (the "endwell"). A "cold finger" or cryogenic cooling device is generally inserted into the bore of the coldwell to effect cooling of the detector array. Often the surfaces of the coldwell within the vacuum space are metalized and then etched or delineated in order to define conductive leads which run the length of the bore.

Past dewars have used a gold plated glass bore to provide a thermally reflective shield which reduces radiation heat load. In addition, glass has been used because it has the advantage that it is both a good electrical insulator and a poor thermal conductor. Moreover, glass is not ductile and once fixed in the system, alignment will remain true unless the bore breaks. However, the glass coldwell has the disadvantage that it is extremely fragile and requires complex and expensive assembly techniques.

In some prior art dewars, the base portion of the coldwell supports a flange to which a cap is attached. This cap is typically made of some metal which has appropriate structural and thermal properties and can maintain a hard vacuum. The top part of the cap directly above the detector array holds a transmissive window.

One type of dewar is shown in the article entitled "Automatic Testing Of Infrared Detector Arrays", D. A. Jones, SPIE, Vol. 344, Infrared Sensor Technology (1982). In such a dewar, the flange comprises a monolithic ceramic disc with a center through hole. The upper surface of such a ceramic disc includes a radial pattern of electrically conductive paths from the inside diameter to the outside diameter. The delineated conductors from the detector device that are on the coldwell are connected via jumper wires to the inside diameter portion of the conductor paths on the ceramic disc. The opposite end of the conductive paths on the outside diameter portion of the ceramic disc connect to a pin assembly covering substantially all of the disc outside the vacuum chamber. A tape cable connects these pins to a bias resistor board or pack and/or an external connector located on the protective dewar housing. A fused dielectric ring covers the conductive paths on the inner portion of the ceramic disc providing an electrically insulated, vacuum tight surface. A metal ring is fused onto the dielectric ring for soldering purposes. Similarly, a metalization is deposited on the other side of the ceramic disc. The upper vacuum cap is attached to the ceramic by soldering and the lower base is attached to the ceramic by brazing to the metalized ring.

The above described design has some disadvantages. The attachment of the upper cap to the dielectric surface of the monolithic ceramic forms a relatively weak joint which is easily damaged during handling. Also, the use of conductive paths on the surface of the ceramic disc tends to create, in combination with the dielectric fusing process, a joint which may develop vacuum leaks. Further, the dispersed pin configuration makes in-process electrical testing difficult because the inner-most pins are not readily accessible.

In a second dewar design, a metal flange, bonded appropriately to the glass coldwell, serves primarily as a supporting member for the vacuum chamber cap and window. The base portion of the glass coldwell is thickened so that it may include buried conductive wires which surface above and below the flange providing an electrical exit from the vacuum chamber. Gold wires are used to connect the axial leads on the coldwell to both the detector array and to the surfaced conductors on the coldwell above the flange. The conductors surfacing below the flange (outside the vacuum) may be connected to a conventional tape cable or other wiring device.

In either of these designs, a second larger flange may be connected to the coldwell at its base. This flange supports an outer protective housing which encloses the vacuum chamber, as well as supporting the mounting flange for the dewar. The housing has openings for the end of the vacuum cap and the electrical connectors. In either design, a tape cable or other wiring device connects from the vacuum exit conductors to standard electrical interconnects. This tape cable generally takes the form of a copper conductor pattern electrodeposited on a Polyimide Kapton sheet. The tape cable is usually multilayered.

These prior designs have several disadvantages. First, to repair the detector array or other connections within the vacuum chamber, the entire device must be disassembled; the outer housing and the vacuum cap removed. Second, since the coldwell is made of glass, the device is particularly susceptible to breakage during assembly, disassembly, and normal in-house and end item use. Third, the gold jumper wires used at the array, flange and at the buried lead connections are susceptible to breakage. Fourth, the volume of the vacuum chamber is usually a small percentage of that of the finished assembly, such that when materials outgas into he vacuum chamber, the vacuum degrades at a high rate. Finally, because the design uses many parts and requires use of complex assembly techniques, the cost per unit is usually high.

Accordingly, it is a primary object of the present invention to provide an improved detector dewar assembly.

SUMMARY OF THE INVENTION

These and other objects of the present invention are achieved by providing a dewar vessel having a metal coldwell, a single vessel providing simultaneously a vacuum chamber, an internal tape cable and hermetically sealed pin connector(s) in an annular disc assembly in order to provide connection between the detector array and external signal processing devices. The stress relieved tape cable minimizes heat load, while reducing the total number of electrical interconnections. As a result of fewer component parts and simplified assembly techniques, system reliability is increased and the total system cost is decreased.

BRIEF DESCRIPTION OF THE DRAWINGS

The above and other objects of the present invention are achieved in the illustrative embodiment as described with respect to the Figures in which:

FIGS. 1A and 1B show a top view and a cross-section through the device of the present invention, respectively;

DETAILED DESCRIPTION OF THE PREFERRED EMBODIMENT(S)

Figure 2A:
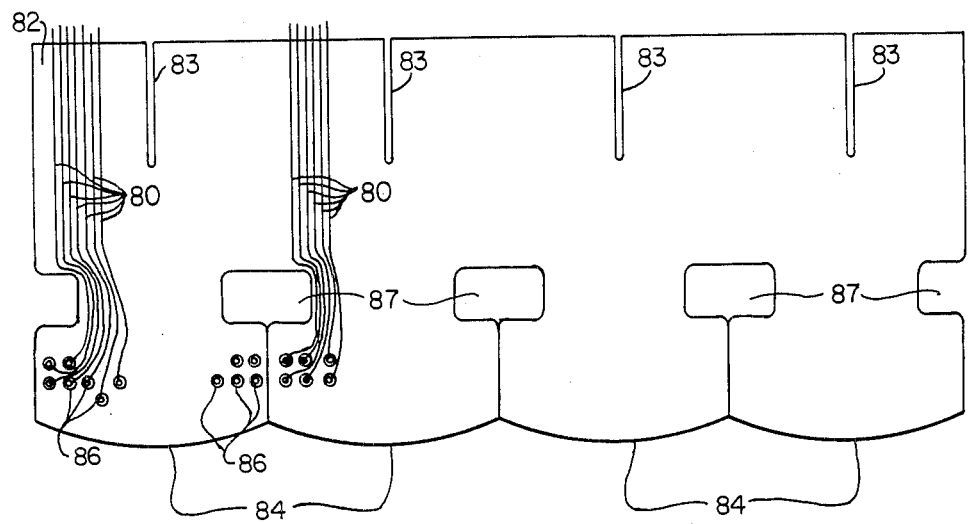
FIGS. 2A and 2B show the tape cable apparatus of the present invention in plan and isometric views, respectively.

Referring to FIGS. 1A and 1B, the apparatus of the present invention includes a metal coldwell 10 with endwell 12 which supports detector assembly 14; a vacuum vessel 15 having a base 22, flange/wall member 16, protective shield ring 27, lower cap ring 18 and upper cap 20 with transmissive window 24. A flexible tape cable 36, in the shape of a top hat (without the top horizontal surface), provides electrical connection between detector assembly 14 and external pin connector assembly 38. The support ring 46 provides a mounting plane for the external pin connector assembly 38. Ceramic disc 40, the main structural member of connector assembly 38, forms a portion of the vacuum wall of dewar 15 as shown. A conventional pinch-off tube 28 (used for evacuating the dewar) and getter/feedthroughs 30 (which absorbs outgassed materials within the evacuated chamber) are mounted through flange/wall member 16 in a conventional manner.

Base 22 and other vacuum chamber members 10, 12, 16, 18, 20 and 24 described above, may be made of any material which is mechanically rigid, has appropriate thermal properties, can hold a vacuum and does not outgas inpurities at an unacceptable rate when evacuated. Typically, the metal members will be made of stainless steel, Kovar or some other metal which may be easily assembled by, for example, soldering, welding or brazing techniques. Similarly, shield ring 27 may be made of any mechanically durable and formable material, such as plastic or metal. Upper cap 20 may be attached to lower cap 18 by soldering. Upper cap 20 may be easily removed to provide direct access to detector assembly 14, as well as elements 12 and 36.

Coldwell 10 may be made of any material which is readily attached to base 22 and which has low thermal conductivity, and high mechanical strength. The wall thickness of coldwall 10 is minimized to reduce thermal conduction. In addition, the external surface of coldwell 10 may be coated to provide a thermally reflective surface to lower the radiation heat load of the dewar.

Figure 2B:
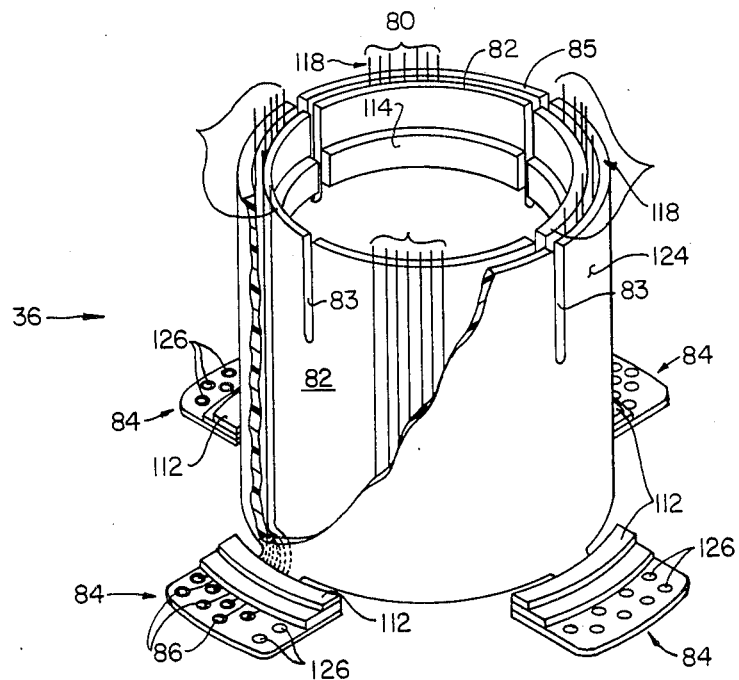
Figure 3:
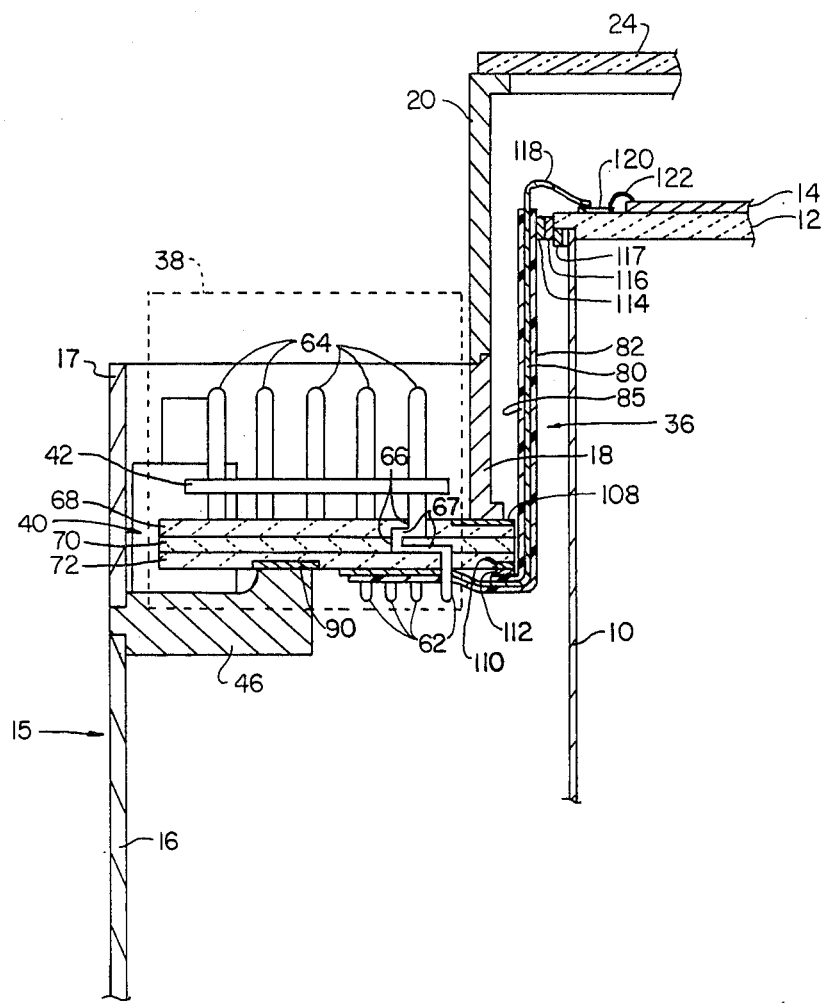
FIG. 3 shows a detailed cross-section through the electrical feed through subassembly of the apparatus of the present invention.

The flexible tape cable 36 provides electrical connection between detector assembly 14 and external pin connector assembly 38. As shown in FIGS. 2A and 2B, the tape cable 36 of the present invention comprises a series of wires 80 embedded in or on a flexible nonconductive base 82. Wires 80 extend beyond base 82 on the upper portion of tape cable 36 in order to facilitate connection to the endwell 12. The lower portion of the tape cable is cut to form tabs 84. Tabs 84 contain the base ends of wires 80 which terminate in pin receptacles 86, which may be soldered or otherwise fastened to pins 62 at the base of disc 40, as shown in FIGS. 1B and 3. In an alternative embodiment (not shown), pin receptacles 86 can be replaced with bump pads which may be soldered, spotwelded, or bonded (ultrasonic or thermosonic) to raised conductive pads (rather than pins 62) positioned on the base of disc 40.

As shown in FIG. 2A, the shape of cable 36, particularly the shape of tabs 84 and holes 87, provide a form which may be substantially wrapped around coldwell 10 as shown in FIG. 2B. Tabs 84 with receptacles 86 may be bent out from the coldwell 10 at substantially a ninety degree angle to provide electrical connection to the pins 62 and disc 40. Slots 83 provide additional flexibility and alignment of the upper portion of cable 36.

Wires 80 might be comprised of Manganin, Constantan, Balco or an equivalent material having high thermal resistance. Base 82 might comprise a thin sheet of Polyimide material or Paralyene to which has been adhered a metal foil which is etched to form wires 80. A modified acrylic adhesive or the equivalent is used which will not outgas into the dewar vessel 15 at an unacceptable rate. In an alternative embodiment, the metal film or wires 80 may be electrodeposited on base 82. A second layer of Polyimide or Paralyene may be positioned over base 82 and wires 80 to form a protective layer 85. If necessary, exterior surface 124 of layer 85 may be coated with gold or a similar material to further reduce the radiative heat load of tape cable 36.

Stress relief may be achieved in tape cable 36 by a variety of features. One feature is the use of solder pads 112 and solder band 114 which are positioned, respectively, on exterior surface 124 of layer 85 over tabs 84 and on the interior surface of base 82 near wire ends 118, as shown in FIG. 2B. Solder band or dots 114 are soldered to a metalized band 116 positioned on ceramic skirt 117 of endwell 12 as shown in FIG. 3, thus stabilizing tape cable 36 with respect to coldwell 10 and leaving wire ends 118 in a position to be easily bonded to the conductive endwell pattern 120 which provides electrical connection, via jumper wires 122, to detector assembly 14. Similarly, solder pads or dots 112 are soldered to metalizations 110 deposited on or embedded in disc 40 as shown in FIG. 3. In addition, slits 83, run longitudinally along the upper portion of tape cable 36 thereby providing alignment and strain relief on cable 36; which might result from the differential expansion and contraction of coldwell 10 and tape cable 36.

Now referring to FIGS. 1A, 1B and 3, external pin connector assembly 38 comprises feedthrough disc 40, bias resistor board 42 and pins 64 and 62. Feedthrough disc 40 is made of a ceramic or other insulating material capable of holding a hard vacuum. Feedthrough disc 40 comprises multiple layers 68, 70 and 72 of material which are attached, as shown in FIG. 3. Electrical connection is made through assembly 40 from pins or pads 62 to pins 64 by a combination of vias 66 and conductor tracks 67 made through and across the surfaces of layers 68, 70 and 72 as shown. It is noted that only one representative conductive path between one of several connector pins of connectors 62 and 64 is shown. In addition, disc 40 may include many more layers, as required by the manufacturing process and pin layout. Similarly, disc 40 may be cut into two or more individual connectors attached to vessel 15 in like fashion.

Disc 40 is brazed to support flange 46 which is soldered, brazed or electron beam welded to wall 16 and protective ring 17. Disc 40 is brazed to support flange 46 and lower cap ring 18 at metalizations 90 and 108, respectively, as shown in FIG. 3. Since a ceramic material is used for disc 40, metalizations 90 and 108, as well as stress relief metalization 110, may be cofired during the manufacture of disc 40, in order to provide a surface on the ceramic which may be brazed or soldered. This technique provides a significantly stronger bond than that attainable by prior techniques of soldering or brazing to a metal fused to a dielectric disposition.

The embodiment shown in FIG. 3 provides several additional advantages. First, placement of metalizations 90 and 108 and attachment of lower cap ring 18 on the top of layer 68 of disc 40 reduces the stress on disc 40 which may be caused by the differential expansion and contraction of support flange 46, lower cap ring 18 and cap 20. Second, by placing lower cap ring 18 on the upper surface of layer 68, the tolerances on cap 18 may be relaxed because exact radial positioning is not required. In addition, the embodiment shown in FIG. 3 is easily manufactured, since gravity, rather than surface tension, holds the brazing material in place during manufacture.

This brazing configuration provides several other advantages. First, the cofired metalizations 90 and 108 provide brazing surfaces which are more resistant to handling or end-use breakage than the monolithic ceramic flange with the fused metal dielectric ring technique previously used. Second, the design of the dewar apparatus of the present invention has substantially fewer parts, and requires simpler and less costly assembly techniques.

By incorporating the ceramic feedthrough disc 40 as part of the vacuum chamber wall, several other advantages are derived. First, the structure of disc 40 insures the vacuum integrity of the assembly by eliminating straight through pin connection. Second, if necessary, a cross-over assembly may be provided by appropriate arrangement of tracks 67 and vias 66 which allow reordering of the configuration of pin connectors 62 from the tape cable 36 to a desired pattern of pin connectors 64 on the feedthrough assembly 40. This allows mating with external device connectors in a predetermined pattern of electrical connections. Finally, this reduces the total part count of the system by incorporating the pin connector in the horizontal plane of vacuum vessel 15.

A single or segmented bias resistor board 42 may be inserted above disc 40 to provide a tailored electrical resistance in each detector element's circuit, together with grounds as required. External connectors (not shown) are mounted to disc 40 above bias resistor board 42 via jackscrew posts 78. It should also be noted that pinch-off tube 28 and getter/feedthrough 30 can be positioned elsewhere on vessel 15 to increase accessibility if required.

Having described the invention, what is claimed as new and novel and for which it is desired to secure Letters Patent is:

1. Dewar apparatus for housing an electromagnetic radiation detector assembly in a vacuum and which provides a means for electrical connection between detector elements of said radiation detector assembly and other signal processing subassemblies external to said apparatus, said apparatus comprising:

A. an outer container, said outer container cylindrical in shape;
   B. an inner container having an end surface at a first end of said inner container, said inner container cylindrical in shape;
   C. means for mounting said inner container in said outer container in a substantially concentric arrangement;
   D. detector means mounted on said end surface of said inner container;
   E. a substantially circular disc assembly having
      (i) an opening for enabling placement of said disc assembly around said inner container,
      (ii) a first side and a second side,
      (iii) an outside diameter which allows placement of said disc assembly within said outer container, and
      (iv) means for providing electrical connection from said first side of said disc assembly to said second side of said disc assembly;
   F. electrical conductor means for connecting said detector means to said means for providing electrical connection, said conductor means located between said detector means and said first side of said disc assembly;
   G. a cap assembly having a cylindrical shape, said cap assembly placed around said inner container and mounted on said second side of said disc assembly at a location between said means for providing electrical connection and said opening of said disc assembly; and
   H. means for mounting said disc assembly to said outer container so as to form a vacuum chamber bounded by said means for mounting, said outer container, said disc assembly and said cap assembly.

2. Apparatus as in claim 1 wherein said inner container is made from a metallic material.

3. Apparatus as in claim 2 wherein said metallic material may be a cobalt/chrome/tungsten/nickel alloy.

4. Apparatus as in claim 1 wherein said cap assembly is detachable from said disc assembly in order to provide access to said detector means.

5. Apparatus as in claim 4 wherein said cap assembly includes a transmissive window positioned such that said detector means may receive radiation from outside of said apparatus.

6. Apparatus as in claim 1 wherein said electrical conductor means comprises a flexible tape cable which is shaped in a top hat configuration around a portion of said inner container near said first end.

7. Apparatus as in claim 1 wherein said cap assembly includes a lower portion and an upper portion, said lower portion fixedly secured to said second side of said disc assembly and said upper portion removably secured to said lower portion.

8. Apparatus as in claim 7 wherein said upper portion is removably secured to said lower portion by soldering, brazing or welding.

9. Apparatus as in claim 1 wherein said means for providing electrical connection includes a plurality of inner and outer terminals, said inner terminals located on said first side and said outer terminals located on said second side, said means for providing electrical connection further comprising means for connecting each of said inner terminals to each of said outer terminals, respectively, by means of an electrical path which inhibits vacuum degradation of said apparatus.

10. Apparatus as in claim 9 wherein said electrical path is typically made with at least two changes in physical direction.

11. Apparatus as in claim 1 wherein said means for providing electrical connection includes:
  A. at least three insulating layers including first and second outer layers and an inner layer, said first outer layer located on said first side and said second outer layer located on said second side;
  B. a plurality of outer terminals mounted on said first outer layer of said insulating layer;
  C. a plurality of inner terminals mounted on said second outer layer of said insulating layers; and
  D. second electrical connection means coupled between each of said outer terminals and said inner terminals, respectively, in a physical path which runs from said inner terminal through said second outer layer, along the junction of said second outer layer and said inner layer, through said inner layer, along the junction of said inner layer and said first outer layer, and then through said first outer layer to said outer terminal.

12. Apparatus as in claim 11 wherein the physical location of connected inner and outer terminals is located in different positions in order to facilitate specific differences in electrical connection of said internal electrical connection means and external cable devices which may be coupled to signal processing equipment.

13. Apparatus as in claim 1 wherein said means for mounting comprises a circular flange having first and second surfaces, said first surface mounted on said outer container and said second surface mounted on said first side of said disc assembly in order to support said disc assembly.

14. Apparatus as in claim 1 wherein said disc assembly is made using electrically insulating material except for that portion of said disc assembly included in said means for providing electrical connection.

15. Apparatus as in claim 1 wherein said electrical conductor means comprises a tape cable having a plurality of electrically conductive paths on or in a flexible, nonconductive material.

16. Apparatus as in claim 1 wherein said electrical conductor means comprises a plurality of conductive paths affixed to a flexible, nonconductive material, said material shaped to fit around said inner container near said first end and inside said cap assembly.

17. Apparatus as in claim 16 wherein said conductive paths are spaced on said material to form a plurality of groups of substantially parallel conductive paths, said groups of paths formed at one end of said material as contact pads formed in a position substantially perpendicular to said conductive paths, each of said pads having a plurality of electrical contacts for connection on said first side to said means for providing electrical connection.

18. Apparatus as in claim 17 further comprising first stress relief means coupled between said electrical conductor means and said inner container near said first end in order to reduce the possibility of interruption of electrical paths between said electrical conductor means and said detector means.

19. Apparatus as in claim 18 further comprising second stress relief means coupled between said electrical conductor means and said first side of said disc assembly in order to reduce the possibility of interruption of electrical paths between said electrical conductor means and said means for providing electrical connection.

20. Apparatus as in claim 19 wherein said first and second stress relief means are made by use of adhesive, solder or welded connections.

21. Apparatus as in claim 20 wherein said solder connections of said first stress relief means are created by use of first and second solder bond bands or dots located on said electrical conductor means, said inner container, and said disc assembly, said first and second solder bands aligned thereby providing a ring of stress relief connections.

22. Apparatus as in claim 17 further comprising a plurality of slits in said material in order to compensate for expansion and contraction of said inner container and alignment of said electrical connection means, said slits positioned from one end of said material near said first end of said inner container and substantially parallel with said conductive paths along a portion of said electrical connection means.

23. Apparatus as in claim 1 wherein said disc assembly includes first and second metalizations which are integrated on said first and second sides, respectively, said first metalization located in a position for mounting of said cap assembly to said disc assembly and said second metalization located in a position for securing said disc assembly to said outer container.

24. Apparatus as in claim 23 wherein said first and second metalizations are integrated with said disc assembly by cofiring at the time of manufacture of said disc assembly.

25. Apparatus as in claim 1 wherein said electrical conductor means includes a plurality of conductive paths made from a material having good electrical conductivity and high thermal resistance.

* * * * *